US011968498B2

(12) United States Patent
Fukamachi

(10) Patent No.: US 11,968,498 B2
(45) Date of Patent: Apr. 23, 2024

(54) PRESSURE WAVE GENERATING ELEMENT AND METHOD FOR PRODUCING THE SAME

(71) Applicant: Murata Manufacturing Co., Ltd., Nagaokakyo (JP)

(72) Inventor: Kohei Fukamachi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 240 days.

(21) Appl. No.: 17/651,473

(22) Filed: Feb. 17, 2022

(65) Prior Publication Data

US 2022/0174425 A1 Jun. 2, 2022

Related U.S. Application Data

(63) Continuation of application No. PCT/JP2020/027447, filed on Jul. 15, 2020.

(30) Foreign Application Priority Data

Aug. 30, 2019 (JP) ................................ 2019-158289

(51) Int. Cl.

| | |
|---|---|
| ***H04R 23/00*** | (2006.01) |
| ***H04R 7/04*** | (2006.01) |
| ***H04R 7/16*** | (2006.01) |
| ***H04R 31/00*** | (2006.01) |

(52) U.S. Cl.

CPC ............ *H04R 23/002* (2013.01); *H04R 7/04* (2013.01); *H04R 7/16* (2013.01); *H04R 31/003* (2013.01); *H04R 2307/025* (2013.01); *H04R 2307/029* (2013.01)

(58) Field of Classification Search

CPC .......... H04R 23/002; H04R 7/04; H04R 7/16; H04R 31/003; H04R 2307/025; H04R 2307/029

USPC .......................................................... 381/164

See application file for complete search history.

(56) References Cited

U.S. PATENT DOCUMENTS

2010/0085729 A1 4/2010 Jiang et al.

FOREIGN PATENT DOCUMENTS

| | | | | |
|---|---|---|---|---|
| JP | H11300274 A | | 11/1999 | |
| JP | 2009296591 A | | 12/2009 | |
| JP | 2010092852 A | | 4/2010 | |
| JP | 2018133625 A | | 8/2018 | |
| WO | 2012020600 A1 | | 2/2012 | |
| WO | WO-2018146951 A1 | * | 8/2018 | ............ G01N 29/24 |

OTHER PUBLICATIONS

Aliev et al. "Alternative Nanostructures for Thermophones, ACS Nano, May 2015, vol. 9, No. 5,pp. 4743-4756". (Year: 2015).*

"Alternative Nanostructures for Thermophones" (Year: 2015).*

Aliev et al., "Alternative Nanostructures for Thermophones," ACS Nano, May 2015, vol. 9, No. 5, pp. 4743-4756.

(Continued)

*Primary Examiner* — Sunita Joshi

(74) *Attorney, Agent, or Firm* — Arentfox Shiff LLP

(57) ABSTRACT

A pressure wave generating element is provided that includes a support and a heat generating layer that is provided on the support and generates heat by energization. Moreover, the heat generating layer includes a fiber with at least a partial metal coating on a surface.

20 Claims, 3 Drawing Sheets

(56) References Cited

OTHER PUBLICATIONS

International Search Report in PCT/JP2020/027447, dated Aug. 18, 2020, 1 page.

La Torraca et al., "High Efficiency Thermoacoustic Loudspeaker Made with a Silica Aerogel Substrate," Advanced Materials Technologies, 2018, vol. 3, Issue 8: 1800139, pp. 1-6.

* cited by examiner

PRESSURE WAVE GENERATING ELEMENT AND METHOD FOR PRODUCING THE SAME

CROSS REFERENCE TO RELATED APPLICATIONS

The present application is a continuation of PCT/JP2020/027447 filed Jul. 15, 2020, which claims priority to Japanese Patent Application No. 2019-158289, filed Aug. 30, 2019, the entire contents of each of which are incorporated herein by reference.

TECHNICAL FIELD

The present invention relates to a pressure wave generating element that generates a pressure wave by periodically heating air. In addition, the present invention also relates to a method for producing a pressure wave generating element.

BACKGROUND

In general, a pressure wave generating element is also referred to as a thermophone, and as an example, a resistor layer is provided on a support. When a current flows through the resistor, the resistor generates heat, and the air in contact with the resistor is thermally expanded, and subsequently, when energization is stopped, the expanded air contracts. Such periodic heating generates sound waves. When a drive signal is set to an audible frequency, it can be used as an acoustic speaker. When a drive signal is set to an ultrasonic frequency, it can be used as an ultrasonic source. Since such a thermophone does not use a resonance mechanism, it is possible to generate a sound wave having a wide band and a short pulse. Since a thermophone generates a sound wave after converting electric energy into thermal energy, improvement in energy conversion efficiency and sound pressure is desired.

In Japanese Patent Application Laid-Open No. 2009-296591 (hereinafter "Patent Document 1"), by providing a carbon nanotube structure in which a plurality of carbon nanotubes are arranged in parallel to each other as a resistor, a surface area in contact with air is increased, and a heat capacity per unit area is reduced. In Japanese Patent Application Laid-Open No. 11-300274 (hereinafter "Patent Document 2"), thermal insulation characteristics are improved by using a silicon substrate as a heat dissipation layer and using porous silicon having low thermal conductivity as a heat insulating layer.

Patent Document 1: Japanese Patent Application Laid-Open No. 2009-296591

Patent Document 2: Japanese Patent Application Laid-Open No. 11-300274

Patent Document 3: WO2012/020600 A

When a carbon nanotube is used as a resistor, the electric resistance increases. Therefore, a considerably high drive voltage is required to generate a required amount of heat generation, and it is difficult to put the drive circuit into practical use. In addition, the carbon nanotube itself is considerably expensive and difficult to handle.

SUMMARY OF THE INVENTION

Accordingly, it is an object of the present invention to provide a pressure wave generating element with improved sound pressure and suitable electric resistance. Further, an object of the present invention is to provide a method for producing such a pressure wave generating element.

According to an exemplary aspect, a pressure wave generating element is provided that includes a support and a heat generating layer that is provided on the support and generates heat by energization. Moreover, the heat generating layer includes a fiber with at least a partial metal coating on a surface.

According to another exemplary aspect, a method for producing a pressure wave generating element includes preparing a support; forming a fiber membrane on the support using a fiber obtained by spinning; and forming a heat generating layer on the fiber membrane by applying a metal coating.

In the pressure wave generating element according to the exemplary aspects of the present invention, the heat generating layer includes the fiber with at least a partial metal coating on a surface, so that the surface area in contact with the air is increased, and the sound pressure is improved. In addition, by using a metal material, the electric resistance of a heating element film can be set to an appropriate value.

In addition, according to the method for producing a pressure wave generating element of an exemplary aspect of the present invention, a heat generating layer having a large surface area in contact with air and having appropriate electric resistance can be realized.

DETAILED DESCRIPTION

Figure 1:
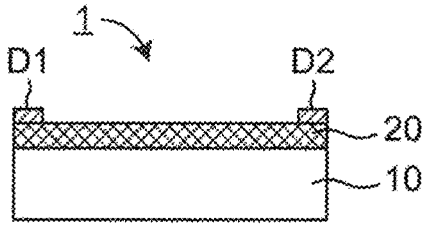
FIG. 1 is a sectional view illustrating an example of a pressure wave generating element according to a first exemplary embodiment.

According to an exemplary aspect of the present invention, a pressure wave generating element is provided that includes a support and a heat generating layer that is provided on the support and generates heat by energization. Moreover, the heat generating layer includes a fiber with at least a partial metal coating on a surface.

According to this configuration, the heat generating layer includes a fiber with at least a partial metal coating on a surface. Therefore, the surface area in contact with air is increased, and the sound pressure with respect to the unit input power is improved. In an exemplary aspect, the fibers can be arranged in a form of a nonwoven fabric, a woven fabric, a knit or a mixture thereof, in which cavities around the fibers communicate with one another to ensure air permeability between an internal cavity and an external space. Therefore, the contact area between a porous structure and the air becomes significantly increased as compared to a non-porous and smooth surface. Therefore, the heat transfer efficiency from the heat generating layer to the air is increased, and the sound pressure can be improved.

By applying the metal coating to the fiber, the electric resistance of the heat generating layer can be easily set to an appropriate value according to the adjustment of a coating film thickness and selection of a coating material. In this way, a desired electric resistance is obtained, and a drive voltage is optimized.

When, for example, a low heat conductive material is used as the fiber, heat conduction from the heat generating layer to the support can be suppressed. Therefore, the temperature change on the surface of the heat generating layer is increased, and the sound pressure with respect to the unit input power is improved. Since the heat generating layer containing such fibers has a porous structure, it is not necessary to introduce a heat insulating layer for improving the sound pressure as described in Patent Document 2.

Moreover, the metal coating is preferably increased in thickness with increasing distance from the support.

Preferably, the metal coating has a thickness T1 at a position closest to the support side, and has a thickness T2 at a position farthest from the support side, and T1<T2.

In addition, the metal coating is preferably not provided on the support side of the fiber.

According to these configurations, heat generation on the side opposite to the support can be enhanced while heat generation is suppressed on the support side inside the heat generating layer. Therefore, while the heat conduction from the heat generating layer to the support is suppressed, the efficiency of heating the air is improved, and the sound pressure with respect to the unit input power is improved.

In an exemplary aspect, the fiber is preferably selected from the group consisting of a polymer fiber, a glass fiber, a carbon fiber, a carbon nanotube, a metal fiber, and a ceramic fiber. For example, composite fibers in which each material is compounded such as a composite fiber of a polymer fiber and a glass fiber, a composite fiber of a polymer fiber and a carbon nanotube, or a composite fiber of a polymer fiber and a ceramic fiber is also preferable.

According to this configuration, the thermal conductivity of the heat generating layer can be appropriately set according to a material to be used.

Moreover, the support is preferably formed of a flexible material.

According to this configuration, since the heat generating layer has flexibility since it is a nonwoven fabric or a woven fabric, a pressure wave generating element having the flexibility can be realized when a support formed of a flexible material is used. Therefore, the degree of freedom of the installation condition of the pressure wave generating element is increased.

In an exemplary aspect, the average fiber diameter (e.g., the diameter) of the fiber provided with the metal coating is preferably 1 nm or more and 2000 nm or less, particularly preferably 1000 nm or less, and more preferably 15 nm or more and 500 nm or less. As a result, heat exchange with air is efficiently performed, and the sound pressure with respect to the unit input power is improved. When the diameter of the fiber is larger than 2000 nm, the surface area of the heat generating layer in contact with air is decreased, and the heat transfer efficiency from the heat generating layer to the air is decreased.

It is also preferable that beads be contained in a part of the fibers. As a result, the sound pressure with respect to the unit input power is improved.

The beads are preferably sandwiched between the fibers provided with the metal coating. As a result, the sound pressure with respect to the unit input power is improved.

According to another exemplary aspect of the present invention, a method for producing a pressure wave generating element includes preparing a support; forming a fiber membrane on the support using a fiber obtained by spinning; and forming a heat generating layer on the fiber membrane by applying a metal coating.

The forming of the fiber membrane can be a method for forming a fiber membrane by directly depositing a spun membrane on a support, or may be a method for forming a fiber membrane on a foil, a film, a mesh, a nonwoven fabric, or the like, and peeling off a fiber membrane from the foil, the film, the mesh, the nonwoven fabric, or the like and adhering the fiber membrane to the support.

According to this configuration, the heat generating layer includes a fiber with at least a partial metal coating on a surface, and functions as a heater. Therefore, the surface area in contact with air is increased, and the sound pressure with respect to the unit input power is improved. In addition, a heat generating layer having appropriate electric resistance can be easily realized.

Moreover, the forming of the fiber membrane is preferably spinning using an electrospinning method.

According to this configuration, fibers having a diameter in the range of 1 nm to 2000 nm, for example, nanofibers, submicron fibers, micron fibers, and the like can be realized by using the electrospinning method.

First Exemplary Embodiment

FIG. 1 is a sectional view illustrating an example of a pressure wave generating element 1 according to a first exemplary embodiment.

As shown, the pressure wave generating element 1 includes a support 10, a heat generating layer 20, and a pair of electrodes D1 and D2. The support 10 is formed of a semiconductor such as silicon or an electrical insulator such as glass, ceramic, or a polymer. A heat insulating layer having a lower thermal conductivity than that of the support 10 is provided on the support 10, so that heat dissipation from the heat generating layer 20 to the support 10 is suppressed. As described later, when the heat generating layer 20 has a heat insulating function, the above-described heat insulating layer may be omitted in an exemplary aspect.

The heat generating layer 20 is provided or disposed on the support 10. The heat generating layer 20 is formed of a conductive material, is electrically driven to generate heat by flowing a current, and emits a pressure wave due to periodic expansion and contraction of air. A pair of electrodes D1 and D2 is provided on both sides of the heat generating layer 20. The electrodes D1 and D2 have a single-layer structure or a multilayer structure made of a conductive material.

In the present embodiment, the heat generating layer 20 includes a fiber with at least a partial metal coating on a surface thereof. Therefore, the surface area in contact with air is increased, and the sound pressure is improved. By applying the metal coating to the fiber, the electric resistance of the heat generating layer 20 can be set to an appropriate value according to the adjustment of a coating film thickness and selection of a coating material.

Moreover, the fibers can be arranged directly on the support 10 or can be arranged via an adhesive layer, such as a polymer material.

Figure 2:
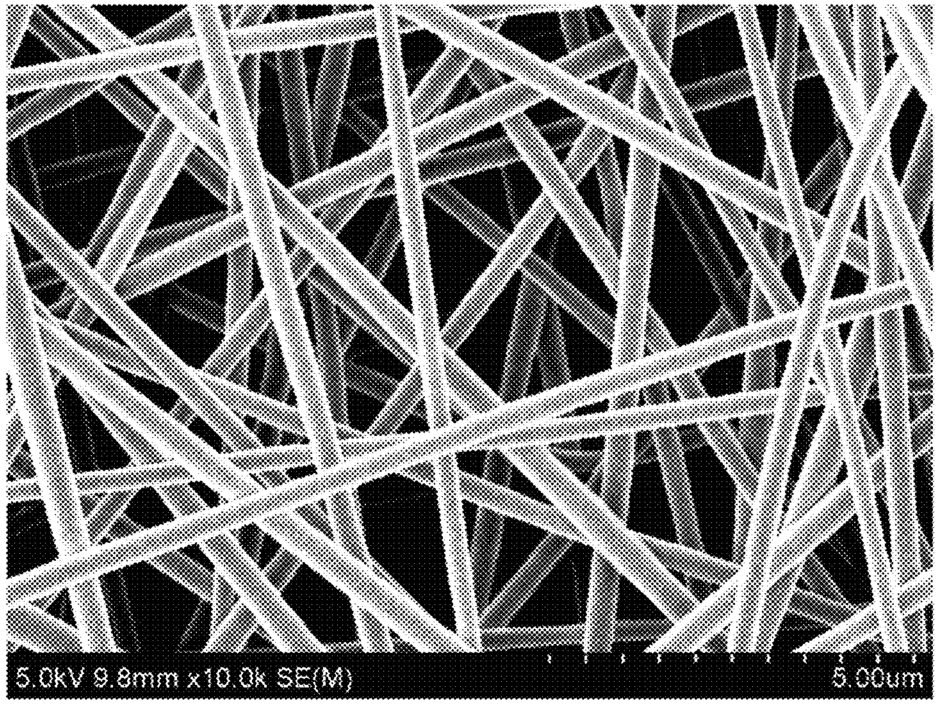
FIG. 2 is an electron micrograph illustrating a surface of a heat generating layer 20.

FIG. 2 is an electron micrograph illustrating a surface of the heat generating layer 20. Hereinafter, a case where the fibers are in the form of a nonwoven fabric that is not woven but is bonded or intertwined by thermal, mechanical or chemical action into a sheet shape will be described. In an exemplary aspect, a metal coating is applied to the surface of the fiber.

According to exemplary aspects, the heat generating layer 20 can be in the form of such a nonwoven fabric, can be in the form of a woven fabric in which warps and wefts are combined, can be in the form of a knitted fabric in which fibers are knitted, or can be in the form of a mixture thereof.

Moreover, the fibers can be selected from the group consisting of polymer fibers, glass fibers, carbon fibers, carbon nanotubes, metal fibers, and ceramic fibers. For example, when a low heat conductive material such as a polymer, glass, or ceramic is used as the fiber, the fiber itself has a heat insulating function, so that heat conduction from the heat generating layer to the support can be suppressed. Therefore, the temperature change on the surface of the heat generating layer is increased, and the sound pressure with respect to the unit input power is improved.

The metal coating is preferably formed of, for example, a metal material such as Au, Ag, Cu, Pt, Rh, Pd, Ru, Ni, Ir, Cr, Mo, W, Ti, or Al, or an alloy containing two or more kinds of these metals. Moreover, the metal coating can have a single layer structure or a multilayer structure formed of a plurality of materials.

Second Exemplary Embodiment

Figure 6:
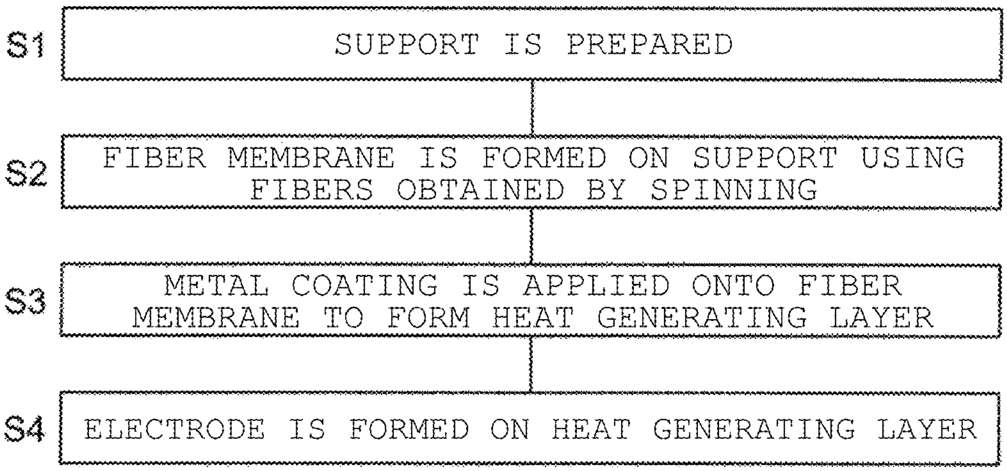
FIG. 6 is a flowchart illustrating an example of a method for producing a pressure wave generating element.

FIG. 6 is a flowchart illustrating an example of a method for producing a pressure wave generating element according to an exemplary aspect. First, in step S1, the support 10 is prepared.

Next, in step S2, a fiber membrane is formed on the support 10 using fibers obtained by spinning. As a spinning method, a melt blowing method, a flash spinning method, a centrifugal spinning method, a melt spinning method, or the like can be employed. Further, a method in which pulp is crushed and processed into a sheet like a cellulose nanofiber can be employed. In particular, when the electrospinning method is used, nanofibers, submicron fibers, micron fibers, and the like can be realized. The spun fibers can be arranged directly on the support 10 in the form of a nonwoven fabric, or can be arranged on the support 10 in the form of a woven fabric combining warp and wefts, or in the form of a knitted fabric in which fibers are knitted.

Next, in step S3, a metal coating is applied onto the obtained fiber membrane to form a heat generating layer 20. As a coating method, vapor deposition, sputtering, electrolytic plating, electroless plating, ion plating, or the like can be employed. As metal materials, those described above can be generally employed.

Next, in step S4, a pair of electrodes D1 and D2 is formed on the obtained heat generating layer 20. As a method for forming a film of an electrode, vapor deposition, sputtering, electrolytic plating, electroless plating, coating, printing, and the like can be adopted. As the electrode material, Au, Ag, Cu, Pt, Rh, Pd, Ru, Ni, Ir, Cr, Mo, W, Ti, Al, or the like can be used.

EXAMPLES

Example 1

(Sample Preparation Method)

A pressure wave generating element was produced by the following method (Sample 1).

A polyvinylidene fluoride (PVDF) solution prepared using a mixed solvent of N,N-dimethylformamide (DMF) and acetone (DMF:acetone=6:4) as a solvent was used as a spinning solution. The solution concentration was adjusted to 10 wt %.

Using this solution, PVDF fibers were spun on a Si substrate (675 μm thick) by an electrospinning method to form a fiber membrane of a nonwoven fabric. In order to enhance the adhesiveness between the fiber membrane and the support, an adhesive layer such as a phenoxy resin may be appropriately introduced into the interface between the Si substrate and the fiber membrane. A natural oxide film ($SiO_2$) was formed on the surface of the Si substrate.

In this method, the electrospinning conditions were an applied voltage of 20 kV, a distance of 15 cm between a nozzle and the support, and a film formation time was adjusted so that the thickness of the fiber membrane was about 1 to 80 μm. The average fiber diameter of the fibers was 172 nm.

Au was deposited on the fiber membrane formed on the support by a vapor deposition method to form a heat generating layer. The Au thin film was formed under the same conditions as in Comparative Sample 1. The average fiber diameter of the metal-coated fibers was 224 nm. As a method for coating a metal on a fiber, a method such as a sputtering method, an ion plating method, or an electroless plating method may be used. As the metal kinds, Au, Ag, Cu, Pt, Rh, Pd, Ru, Ni, Ir, Cr, Mo, W, Ti, Al, or the like can be used.

Figure 3:
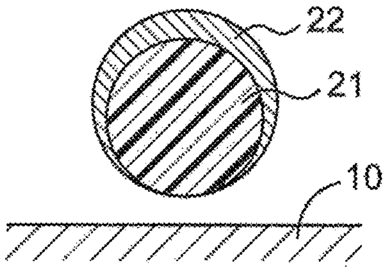
FIG. 3 is a sectional view illustrating a thickness distribution of a metal coating.

In general, the thickness of the metal coating can be uniform or non-uniform in a circumferential direction of the fibers, for example, the thickness can be increased as the distance from the support is increased. The metal coating has a thickness T1 at a position closest to the support side, and has a thickness T2 at a position farthest from the support side, where T1<T2. In the form of the metal coating on the fiber, for example, as illustrated in FIG. 3, there may be a portion where a metal coating 22 is not applied on a lower portion close to the support 10 on a peripheral surface of a fiber 21. This configuration enhances heat generation on the side opposite to the support while suppressing the heat generation on the support side inside the heat generating layer. A coating state (sectional image) of the metal-coated fiber can be analyzed as follows. For example, a sample is processed by a focused ion beam (FIB), and the coating state on the fiber can be analyzed by observation with a transmission electron microscope (e.g., JEM-F200 manufactured by JEOL Ltd.) and element mapping analysis by energy dispersive X-ray spectroscopy.

Figure 4A:
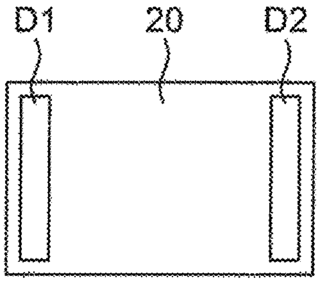
FIGS. 4(A) and 4(B) are plan views illustrating arrangement examples of electrodes.
Figure 4B:
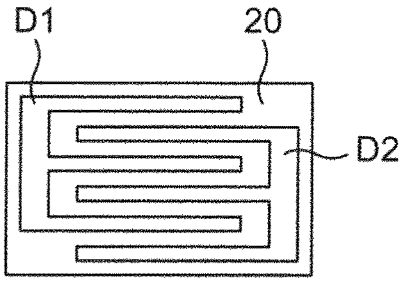

Processing was performed so that an element size was 5 mm×6 mm. A pair of electrodes D1 and D2 was formed on both sides of the sample so as to have a dimension of 0.8 mm×4 mm and an inter-electrode distance of 3.4 mm (FIG. 4A). The stacking structure of the electrode was Ti (10 nm thick), Cu (500 nm thick), and Au (100 nm thick) from the support side. In an exemplary aspect, the electrodes D1 and D2 can have a comb-shaped electrode structure as illustrated in FIG. 4B in order to adjust the element resistance.

(Evaluation Method)

The acoustic characteristics of the pressure wave generating element were measured using a MEMS microphone (e.g., Knowles: SPU0410LR5H). The distance between the pressure wave generating element and the microphone was set to 6 cm, and evaluation was performed by reading an output voltage of the microphone using a burst wave having a frequency of 60 kHz as a drive signal. An input voltage to the pressure wave generating element was set to 6 to 16 V.

Figure 5:
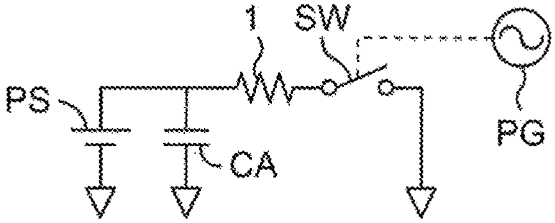
FIG. 5 is a circuit diagram illustrating an example of an evaluation circuit.

FIG. 5 is a circuit diagram illustrating an example of an evaluation circuit. A series circuit of a pressure wave generating element 1 and a switching element SW (for example, FET) was provided between a DC power supply PS and a ground, and the switching element SW was driven by a pulse wave having a frequency of 60 kHz using a pulse generator PG. The applied voltage was 6 to 16 V. A capacitor CA (for example, 3300 μF) is connected in parallel with the DC power supply PS.

In operation, the pressure wave generating element is configured to generate a pressure wave by air heating by the heat generating layer. Therefore, in spite of the same element, the larger the input power, the larger the sound pressure. In order to determine whether or not sound waves can be efficiently generated, sound pressures should be compared with the same power.

As the input power to the thermophone is increased, the microphone output is linearly increased. When the sound conversion efficiency is good, the ratio of the increase ΔV in the microphone output to the increase ΔW in the power is increased. Here, ΔV/ΔW is used as an index of the sound pressure. As a comparison target, the result of Comparative Sample 2 was used as a reference. Furthermore, as a method for measuring the element resistance, the electric resistance value of the obtained element was measured using a digital multimeter (e.g., Agilent 34401 A).

The average fiber diameter of the metal-coated fibers was calculated by acquiring a surface observation image with a scanning electron microscope (e.g., S-4800, acceleration voltage of 5 kV, 20 k times, manufactured by Hitachi, Ltd.) and measuring the fiber diameter from the obtained image. Specifically, 10 fibers per visual field were randomly extracted from the obtained image, the extraction was performed for 5 visual fields to measure a total of 50 fiber diameters, and an average fiber diameter was calculated.

(Comparative Sample Preparation Method)

As Comparative Samples 1 and 2, the results of a pressure wave generating element prepared by forming an Au thin film on a Si substrate by a vapor deposition method are shown. An electrode structure is the same as that of Sample 1.

As Comparative Sample 3, the results of a pressure wave generating element prepared by forming an Au thin film (e.g., 40 nm thick) on a PVDF film by a vapor deposition method are shown. A PVDF film was formed on a Si substrate by spin coating using the same PVDF solution as in Sample 1, and dried at 60° C. to obtain a PVDF film having a thickness of about 1 to 20 μm. The Au thin film (e.g., 40 nm thick) was formed on the PVDF film formed on the Si substrate by a vapor deposition method to obtain Comparative Sample 3. An electrode structure is the same as that of Sample 1.

TABLE 1

| | Element structure | Sound pressure ratio |
|---|---|---|
| Comparative Sample 1 | Au 40 nm/SiO2/Si | 1.4 |
| Comparative Sample 2 | Au 100 nm/SiO2/Si | 1.0 |
| Comparative Sample 3 | Au 40 nm/PVDF film/SiO2/Si | 3.6 |
| Sample 1 | Au coated PVDF fiber/SiO2/Si | 24.6 |

From the results in Table 1, it can be seen that the sound pressure is improved in the case of using the heat generating layer containing an Au-coated PVDF fiber as compared with the case where the Au thin film is formed on the Si substrate by the vapor deposition method.

Since the metal film is formed using the fiber as a molding die as described above, a specific surface area of the heat generating layer can be increased, and the sound pressure with respect to the unit input power can be increased.

In addition, when a low heat conductive material such as a polymer is used as the fiber, there is a heat insulating effect in a support direction. Therefore, the temperature change on the surface of the heat generating layer is increased, and the sound pressure with respect to the unit input power is improved.

The thermal conductivity of PVDF is about 0.18 W/m·K, and the thermal conductivity of $SiO_2$ is about 1.3 W/m·K. Therefore, PVDF has a lower thermal conductivity, a higher heat insulating effect on the support side, and a higher acoustic conversion efficiency. In addition, it is considered that by fiberization of PVDF, a heat generating layer is formed using fibers as a molding die, and the specific surface area of the heat generating layer is increased, so that the acoustic conversion efficiency is increased.

Example 2

(Sample Preparation Method)

A pressure wave generating element was produced by the following method (Sample 2).

A polyimide (PI) solution prepared using N,N-dimethylacetamide (DMAc) as a solvent was used as a spinning solution. The solution concentration was adjusted to 20 wt %.

Using this solution, PI fibers were spun on a Si substrate (675 μm thick) by an electrospinning method to form a fiber membrane of a nonwoven fabric. In order to enhance the adhesiveness between the fiber membrane and the support, an adhesive layer, such as a phenoxy resin, can be appropriately introduced into the interface between the Si substrate and the fiber membrane.

The electrospinning conditions were an applied voltage of 23 kV, a distance of 15 cm between a nozzle and the support, and a film formation time was adjusted so that the thickness of the fiber membrane was about 1 to 80 μm. The average fiber diameter of the fibers was 378 nm.

Au was deposited on the fiber membrane formed on the support by a sputtering method to form a heat generating layer. The average fiber diameter of the metal-coated fibers was 488 nm. As a method for coating a metal on a fiber, a method such as a vapor deposition method, an ion plating method, or an electroless plating method may be used. As the metal kinds, Au, Ag, Cu, Pt, Rh, Pd, Ru, Ni, Ir, Cr, Mo, W, Ti, Al, or the like can be used.

The form of the metal coating (FIG. 3), the element size, the electrode structure (FIG. 4A and FIG. 4B), and the evaluation method are the same as those described in Example 1 as discussed above.

(Comparative Sample Preparation Method)

As Comparative Sample 4, an element using CNTs (carbon nanotubes) was prepared. Hereinafter, a method for preparing an element will be described.

Using a multi-layered CNT ink (e.g., MW-I) manufactured by Meijo Nano Carbon., a film having a thickness of about 500 nm to 1000 nm was formed on a Si substrate by spin coating. The spin coating was performed at a rotation speed of 5000 rpm for 15 seconds and dried at 120° C.

In order to decompose a dispersant contained in a solution, the element was maintained at 400° C. for 2 hours, and a heat treatment was performed to obtain a CNT thin film. A pair of electrodes was formed on both sides of the sample so as to have a dimension of 0.8 mm×4 mm and an inter-electrode distance of 3.4 mm. The stacking structure of the electrode was Ti (10 nm thick), Cu (500 nm thick), and Au (100 nm thick) from the support side.

TABLE 2

| | Element structure | Element resistance (Ω) | Sound pressure ratio |
|---|---|---|---|
| Comparative Sample 4 | MW-CNT/SiO2/Si | 140.1 | 5.7 |
| Sample 2 | Au coated PI fiber/SiO2/Si | 2.9 | 13.6 |

From the results in Table 2, it is shown that when a heat generating layer containing PI fibers coated with Au is used, the element resistance is lowered and the sound pressure is improved as compared with a case where a CNT simple substance is deposited on a Si substrate.

By using the metal-coated fiber as the heat generating layer in this manner, the element resistance can be low, and the sound pressure with respect to the unit input power can be increased. In addition, since the element resistance is lowered, low voltage driving becomes possible.

Example 3

(Sample Preparation Method)

A pressure wave generating element was produced by the following method (Samples 3, 4, 5).

A polyvinyl alcohol (PVA) solution prepared using water as a solvent was used as a spinning solution. The solution concentration was adjusted to 8.5 wt %.

Using this solution, PVA fibers were spun on a Si substrate (675 μm thick) by an electrospinning method to form a fiber membrane of a nonwoven fabric. In order to enhance the adhesiveness between the fiber membrane and the support, an adhesive layer such as a phenoxy resin may be appropriately introduced into the interface between the Si substrate and the fiber membrane.

The electrospinning conditions were an applied voltage of 30 kV, a distance of 15 cm between a nozzle and a substrate, and a film formation time was adjusted so that the thickness of the fiber membrane was about 1 to 80 μm. The average fiber diameter of the fibers was 188 nm.

Au was deposited on the fiber membrane formed on the support by a vapor deposition method to form a heat generating layer. In this sample preparation method, the thickness of Au was controlled by a vapor deposition time. As a method for coating a metal on a fiber, a method such as a sputtering method, an ion plating method, or an electroless plating method may be used. As the metal kinds, Au, Ag, Cu, Pt, Rh, Pd, Ru, Ni, Ir, Cr, Mo, W, Ti, Al, or the like can be used.

The form of the metal coating (FIG. 3), the element size, the electrode structure (FIG. 4A and FIG. 4B), and the evaluation method are the same as those described in (Example 1).

TABLE 3

| | Element structure | Average diameter of metal-coated fibers | Element resistance (Ω) | Sound pressure ratio |
|---|---|---|---|---|
| Sample 3 | Au coated PVA fiber/SiO2/Si | 228 nm | 811.1 | 48.3 |
| Sample 4 | Au coated PVA fiber/SiO2/Si | 265 nm | 12.7 | 20.3 |
| Sample 5 | Au coated PVA fiber/SiO2/Si | 422 nm | 2.8 | 9.4 |

From the results in Table 3, it is shown that the sound pressure is further improved as the metal-coated fiber diameter decreases in the case of using the heat generating layer containing an Au-coated PVA fiber.

Example 4

(Sample Preparation Method)

A pressure wave generating element was produced by the following method (Sample 6).

A polyvinylidene fluoride (PVDF) solution prepared using a mixed solvent of N,N-dimethylformamide (DMF) and acetone (DMF:acetone=6:4) as a solvent was used as a spinning solution. The solution concentration was adjusted to 10 wt %.

Using this solution, PVDF fibers were spun on a PET film (20 μm thick) by an electrospinning method to form a fiber membrane of a nonwoven fabric. In order to enhance the adhesiveness between the fiber membrane and the support, an adhesive layer such as a phenoxy resin may be appropriately introduced into the interface between the PET film and the fiber membrane.

The electrospinning conditions were an applied voltage of 20 kV, a distance of 15 cm between a nozzle and the support, and a film formation time was adjusted so that the thickness of the fiber membrane was about 1 to 80 μm.

Au was deposited on the fiber membrane formed on the support by a vapor deposition method to form a heat generating layer. As a method for coating a metal on a fiber, a method such as a sputtering method, an ion plating method, or an electroless plating method may be used. As the metal kinds, Au, Ag, Cu, Pt, Rh, Pd, Ru, Ni, Ir, Cr, Mo, W, Ti, Al, or the like can be used.

The form of the metal coating (FIG. 3), the element size, the electrode structure (FIG. 4A and FIG. 4B), and the evaluation method and metal-coated fiber diameter are the same as those described in Example 1 as discussed above.

As described above, in Sample 6, since both the support and the heat generating layer have flexibility, a pressure wave generating element having the flexibility can be realized. Therefore, the degree of freedom of the installation condition of the pressure wave generating element is increased, and for example, the pressure wave generating element can be used by being attached to a curved base.

Example 5

(Sample Preparation Method)

A pressure wave generating element was produced by the following method (Samples 7 to 19).

A polyvinylidene fluoride (PVDF) solution prepared using a mixed solvent of N,N-dimethylformamide (DMF) and acetone (DMF:acetone=6:4) as a solvent was used as a spinning solution. The solution concentration was adjusted to 3 wt % to 20 wt %. The fiber diameter obtained by electrospinning can be controlled by adjusting the solution concentration.

Figure 7:
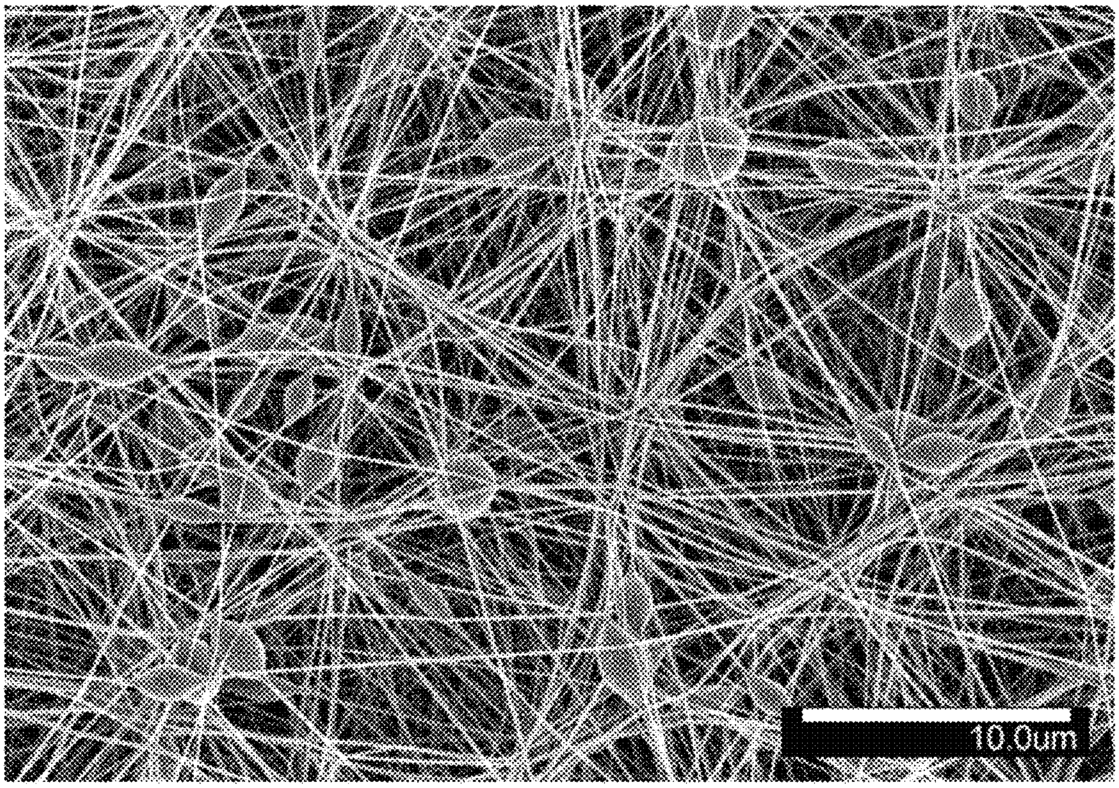
FIG. 7 is an electron micrograph illustrating an example of a fiber membrane in which beads are generated.

Spherical or spheroid beads as illustrated in FIG. 7 may be formed in the fiber by lowering the concentration and viscosity of the solution, but the beads can be contained in the fiber membrane used for the pressure wave generating element (Samples 11, 14, 17, 18, and 19). The size of the beads is 0.5 to 3.0 μm in short diameter. In addition, the beads may have a hollow spherical shape or a long spherical shape. On the other hand, in order to obtain fibers in which generation of beads was suppressed in a low concentration solution, lithium chloride was added to the solution in an amount of 1.0 wt % with respect to the polymer weight (Samples 12, 13, 15, and 16). In addition, tetrabutylammonium chloride, potassium trifluoromethanesulfonate, or the like can be used as an additive.

Using these solutions, PVDF fibers were spun on a Si substrate (675 μm thick) by an electrospinning method to form a fiber membrane of a nonwoven fabric. In order to enhance the adhesiveness between the fiber membrane and the substrate, an adhesive layer may be appropriately introduced into the interface between the Si substrate and the fiber membrane.

The electrospinning conditions were an applied voltage of 20 kV, a distance of 15 cm between a nozzle and a substrate, and a film formation time was adjusted so that the thickness of the fiber membrane was about 1 to 80 μm.

Au was deposited in a thickness of 1 to 40 nm on the fiber membrane formed on the substrate by a sputtering method to form a heat generating layer. As a method for coating a metal on a fiber, a method such as a vapor deposition method, an ion plating method, or an electroless plating method may be used. As the metal kinds, Au, Ag, Cu, Pt, Rh, Pd, Ru, Ni, Ir, Cr, Mo, W, Ti, Al, or the like can be used.

The form of the metal coating (FIG. 3), the element size, the electrode structure (FIG. 4A and FIG. 4B), and the evaluation method are the same as those described in Example 1 as discussed above.

The diameter of the metal-coated fiber was measured as follows.

The average fiber diameter of the metal-coated fibers was calculated by acquiring a SEM image observed with a scanning electron microscope (e.g., S-4800, acceleration voltage of 5 kV, 3 k to 120 k times, manufactured by Hitachi, Ltd.) and measuring the fiber diameter from the obtained image. Specifically, 10 fibers per visual field were randomly extracted from the obtained image, the extraction was performed for 5 visual fields to measure a total of 50 fiber diameters, and an average fiber diameter was calculated. For the fiber membrane in which beads were formed, the average fiber diameter was calculated by measuring the diameter of the fiber shape at a position where beads were not formed.

Figure 8:
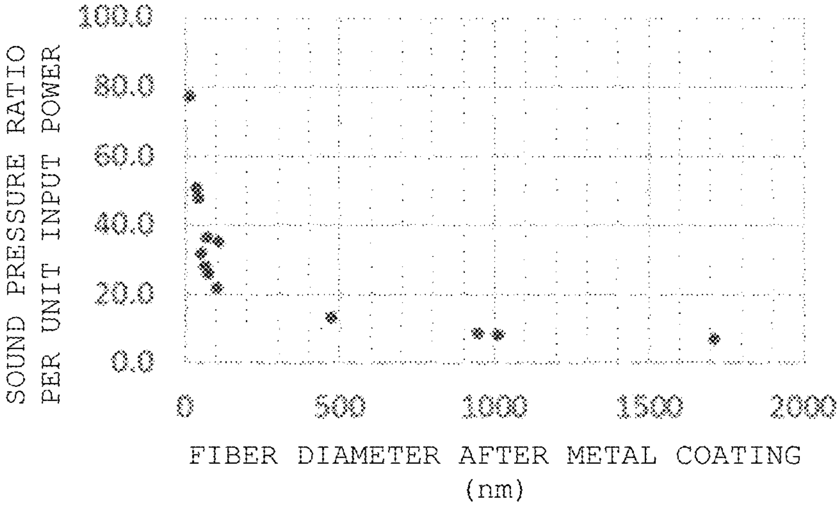
FIG. 8 is a graph illustrating a relationship between an average fiber diameter of PVDF fibers after metal coating and a sound pressure ratio per unit input power.

Table 4 indicates a relationship between an average fiber diameter of PVDF fibers after metal coating and a sound pressure ratio per unit input power for Samples 7 to 19. FIG. 8 is a graph illustrating this relationship.

TABLE 4

| | Solution concentration Wt % | Average diameter of metal-coated fibers nm | Sound pressure ratio |
|---|---|---|---|
| Sample 7 | 20 | 1711 | 6.7 |
| Sample 8 | 16 | 1012 | 8.2 |
| Sample 9 | 15 | 949 | 8.7 |
| Sample 10 | 11 | 476 | 13.1 |
| Sample 11 | 7 | 109 | 34.8 |
| Sample 12 | 7 | 106 | 21.5 |
| Sample 13 | 6 | 77 | 25.8 |
| Sample 14 | 6 | 73 | 36.1 |
| Sample 15 | 5 | 67 | 27.7 |
| Sample 16 | 4 | 55 | 31.5 |
| Sample 17 | 5 | 43 | 47.7 |
| Sample 18 | 4 | 40 | 50.7 |
| Sample 19 | 3 | 18 | 76.9 |

As indicated in Table 4 and FIG. 8, when the fiber diameter is 1000 nm or less, a pressure wave generating element having a high sound pressure per unit input power can be obtained. In particular, when the fiber diameter is 500 nm or less, the sound pressure per unit input power is dramatically improved.

Sample 11 and Sample 12 had the same fiber diameter, but Sample 11 containing beads in the fiber membrane showed a high sound pressure per unit input power. This phenomenon is presumed to be occurred because when beads were formed in the fiber membrane and sandwiched between fibers provided with a metal coating, the beads served as spacers, the pore size in the film was increased, and heat generation of not only the layer near the surface but also the layer near the substrate was efficiently converted as an acoustic output.

By reducing the fiber diameter in this manner, the specific surface area of the heat generating layer can be increased, and the sound pressure with respect to the unit input power can be increased. In addition, by forming beads in the fiber, the sound pressure with respect to the unit input power can be increased.

Example 6

(Sample Preparation Method)

A pressure wave generating element was produced by the following method (Sample 20).

A nylon 6 solution prepared using a mixed solvent of formic acid and tetrahydrofuran (THF) (formic acid: THF=7.5:2.5) as a solvent was used as a spinning solution. The solution concentration was adjusted to 12.5 wt %.

Using this solution, nylon 6 fibers were spun on a Si substrate (675 μm thick) by an electrospinning method to form a fiber membrane of a nonwoven fabric. In order to enhance the adhesiveness between the fiber membrane and the substrate, an adhesive layer may be appropriately introduced into the interface between the Si substrate and the fiber membrane.

The electrospinning conditions were an applied voltage of 29 kV, a distance of 13 cm between a nozzle and a substrate, and a film formation time was adjusted so that the thickness of the fiber membrane was about 1 to 80 μm. The average fiber diameter of the fibers was 71 nm.

Au was deposited on the fiber membrane formed on the substrate by a sputtering method. The average fiber diameter of the metal-coated fibers was 84 nm. As a method for coating a metal on a fiber, a method such as a vapor deposition method, an ion plating method, or an electroless plating method may be used. As the metal kinds, Au, Ag, Cu, Pt, Rh, Pd, Ru, Ni, Ir, Cr, Mo, W, Ti, Al, or the like can be used.

The form of the metal coating (FIG. 3), the element size, the electrode structure (FIG. 4A and FIG. 4B), and the evaluation method are the same as those described in Example 1 as discussed above.

The diameter of the metal-coated fiber was measured as follows.

The average fiber diameter of the metal-coated fibers was calculated by acquiring a SEM image observed with a scanning electron microscope (e.g., S-4800, acceleration voltage of 5 kV, 30 k times, manufactured by Hitachi, Ltd.) and measuring the fiber diameter from the obtained image. Specifically, 10 fibers per visual field were randomly extracted from the obtained image, the extraction was performed for 5 visual fields to measure a total of 50 fiber diameters, and an average fiber diameter was calculated. For the fiber membrane in which beads were formed, the average fiber diameter was calculated by measuring the diameter of the fiber shape at a position where beads were not formed.

Table 5 indicates a relationship between an average fiber diameter of nylon 6 fibers after metal coating and a sound pressure ratio per unit input power for Sample 20.

TABLE 5

| | Average diameter of metal-coated fibers nm | Sound pressure ratio |
|---|---|---|
| Sample 20 | 84 | 27.3 |

Since the metal film is formed using the fiber as a die as described above, a specific surface area of the heat generating layer can be increased, and the sound pressure with respect to the unit input power can also be increased. In addition, since a low heat conductive material such as a polymer is used as the fiber layer, a heat insulating effect in the substrate direction can be obtained. Therefore, the temperature change on the surface of the heating element is increased, and the sound pressure with respect to the unit input power can be increased.

Example 7

(Sample Preparation Method)

A pressure wave generating element was produced by the following method (Sample 21).

An epoxy resin (bisphenol A type) solution prepared using N,N-dimethylacetamide (DMAc) as a solvent was used as a spinning solution. The solution concentration was adjusted to 30 wt %. At this time, additives such as imidazoles can be appropriately used.

Using this solution, epoxy resin fibers were spun on a Si substrate (675 μm thick) by an electrospinning method to form a fiber membrane of a nonwoven fabric. In order to enhance the adhesiveness between the fiber membrane and the substrate, an adhesive layer may be appropriately introduced into the interface between the Si substrate and the fiber membrane.

The electrospinning conditions were an applied voltage of 23 kV, a distance of 15 cm between a nozzle and a substrate, and a film formation time was adjusted so that the thickness of the fiber membrane was about 1 to 80 μm. The average fiber diameter of the fibers was 235 nm.

Au was deposited on the fiber membrane formed on the substrate by a sputtering method. The average fiber diameter of the metal-coated fibers was 248 nm. As a method for coating a metal on a fiber, a method such as a vapor deposition method, an ion plating method, or an electroless plating method may be used. As the metal kinds, Au, Ag, Cu, Pt, Rh, Pd, Ru, Ni, Ir, Cr, Mo, W, Ti, Al, or the like can be used.

The form of the metal coating (FIG. 3), the element size, the electrode structure (FIG. 4A and FIG. 4B), and the evaluation method are the same as those described in Example 1 as discussed above.

The diameter of the metal-coated fiber was measured as follows.

The average fiber diameter of the metal-coated fibers was calculated by acquiring a SEM image observed with a scanning electron microscope (e.g., S-4800, acceleration voltage of 5 kV, 20 k times, manufactured by Hitachi, Ltd.) and measuring the fiber diameter from the obtained image. Specifically, 10 fibers per visual field were randomly extracted from the obtained image, the extraction was performed for 5 visual fields to measure a total of 50 fiber diameters, and an average fiber diameter was calculated. For the fiber membrane in which beads were formed, the average fiber diameter was calculated by measuring the diameter of the fiber shape at a position where beads were not formed.

Table 6 indicates a relationship between an average fiber diameter of epoxy resin fibers after metal coating and a sound pressure ratio per unit input power for Sample 21.

TABLE 6

| | Average diameter of metal-coated fibers nm | Sound pressure ratio |
|---|---|---|
| Sample 21 | 248 | 20.3 |

Since the metal film is formed using the fiber as a die as described above, a specific surface area of the heat generating layer can be increased, and the sound pressure with respect to the unit input power can be increased. In addition, since a low heat conductive material such as a polymer is used as the fiber layer, a heat insulating effect in the substrate direction can be obtained. Therefore, the temperature change on the surface of the heating element is increased, and the sound pressure with respect to the unit input power can be increased.

Example 8

(Sample Preparation Method)

A pressure wave generating element was produced by the following method (Samples 22 and 23).

A polyamic acid solution prepared using N,N-dimethylacetamide (DMAc) as a solvent was used as a spinning solution. The solution concentration was adjusted to 23 wt %. For the preparation of Sample 22, 5.0 wt % of potassium trifluoromethanesulfonate was added to the solution based on the polymer weight. On the other hand, in the preparation of Sample 23, the additives are not added to the solution. As the additives to the solution, tetrabutylammonium chloride, lithium chloride, and the like can be used. By adding these, fibers in which generation of beads is suppressed can be obtained.

Using these solutions, polyamic acid resin fibers were spun on a Si substrate (675 μm thick) by an electrospinning method to form a fiber membrane of a nonwoven fabric. In order to obtain a fiber membrane used for the pressure wave generating element, beads may be contained in the fiber membrane. Further, in order to enhance the adhesiveness between the fiber membrane and the substrate, an adhesive layer can be appropriately introduced into the interface between the Si substrate and the fiber membrane.

The electrospinning conditions were an applied voltage of 23 kV, a distance of 14 cm between a nozzle and a substrate, and a film formation time was adjusted so that the thickness of the fiber membrane was about 1 to 80 μm. The obtained polyamic acid fibers were subjected to a heat treatment (imidization) at 300° C. for 1 hour to obtain a polyimide fiber. The average fiber diameter of the polyimide fibers was 76 nm for Sample 22 and 66 nm for Sample 23.

Au was deposited on the fiber membrane formed on the substrate by a sputtering method. The average fiber diameters of the metal-coated fibers were 87 nm and 78 nm, respectively. As a method for coating a metal on a fiber, a method such as a vapor deposition method, an ion plating method, or an electroless plating method may be used. As the metal kinds, Au, Ag, Cu, Pt, Rh, Pd, Ru, Ni, Ir, Cr, Mo, W, Ti, Al, or the like can be used.

The form of the metal coating (FIG. 3), the element size, the electrode structure (FIG. 4A and FIG. 4B), and the evaluation method are the same as those described in Example 1 as discussed above.

The diameter of the metal-coated fiber was measured as follows.

The average fiber diameter of the metal-coated fibers was calculated by acquiring a SEM image observed with a scanning electron microscope (e.g., S-4800, acceleration voltage of 5 kV, 50 k times, manufactured by Hitachi, Ltd.) and measuring the fiber diameter from the obtained image. Specifically, 10 fibers per visual field were randomly extracted from the obtained image, the extraction was performed for 5 visual fields to measure a total of 50 fiber diameters, and an average fiber diameter was calculated. For the fiber membrane in which beads were formed, the average fiber diameter was calculated by measuring the diameter of the fiber shape at a position where beads were not formed.

Table 7 indicates a relationship between an average fiber diameter of polyimide fibers after metal coating and a sound pressure ratio per unit input power for Samples 22 and 23.

TABLE 7

| | Average diameter of metal-coated fibers nm | Sound pressure ratio |
|---|---|---|
| Sample 22 | 87 | 23.0 |
| Sample 23 | 78 | 31.2 |

Since the metal film is formed using the fiber as a die as described above, a specific surface area of the heat generating layer can be increased, and the sound pressure with respect to the unit input power can be increased. In addition, since a low heat conductive material, such as a polymer is used, as the fiber layer, a heat insulating effect in the substrate direction can be obtained. Therefore, the temperature change on the surface of the heating element is increased, and the sound pressure with respect to the unit input power can be increased. In addition, by forming beads in the fiber, the sound pressure with respect to the unit input power can be increased.

In general, although the present invention has been fully described in connection with exemplary embodiments with reference to the accompanying drawings, various changes and modifications will be apparent to those skilled in the art.

DESCRIPTION OF REFERENCE SYMBOLS

1: Pressure wave generating element
10: Support
20: Heat generating layer
21: Fiber
22: Metal coating
D1, D2: Electrode

The invention claimed is:

1. A pressure wave generating element comprising:
a support;
a heat generating layer disposed on the support and configured to generate heat by energization;
a pair of electrodes disposed on a surface of the heat generating layer opposite the support,
wherein the heat generating layer includes a fiber with at least a partial metal coating on a surface thereof, and
wherein the partial metal coating has a thickness that increases with an increasing distance from the support.

2. The pressure wave generating element according to claim 1, wherein the thickness of the metal coating is a largest distance on the surface of the fiber that is opposite the support.

3. The pressure wave generating element according to claim 1, wherein the metal coating has a thickness T1 at a position closest to the support, and has a thickness T2 at a position farthest from the support, and T1<T2.

4. The pressure wave generating element according to claim 1, wherein the metal coating is not disposed on the surface of the fiber that is closest to the support.

5. The pressure wave generating element according to claim 1, wherein the fiber comprises a polymer fiber.

6. The pressure wave generating element according to claim 1, wherein the fiber comprises a plurality of fibers and an average fiber diameter of the plurality of fibers of the heat generating layer is 1 nm or more and 1000 nm or less.

7. The pressure wave generating element according to claim 6, wherein the average fiber diameter is 15 nm or more and 500 nm or less.

8. The pressure wave generating element according to claim 1, wherein the fiber comprises a plurality of fibers and beads are contained in a part of the fibers.

9. A pressure wave generating element comprising:
a support;
a heat generating layer disposed on the support and configured to generate heat by energization;
a pair of electrodes disposed on a surface of the heat generating layer opposite the support,
wherein the heat generating layer includes a plurality of fibers and beads, with the plurality of fibers having at least a partial metal coating on a surface thereof, and
wherein the plurality of beads are sandwiched between the plurality of fibers having the partial metal coating disposed thereon.

10. The pressure wave generating element according to claim 1, wherein the support comprises a flexible material.

11. The pressure wave generating element according to claim 1, wherein the support comprises one of a semiconductor or an electrical insulator.

12. The pressure wave generating element according to claim 1, wherein the heat generating layer comprises a conductive material and is configured to emit a pressure wave due to periodic expansion and contraction of air.

13. The pressure wave generating element according to claim 1, wherein the fiber comprises a plurality of fibers of a nonwoven fabric that is bonded or intertwined by one of a thermal, mechanical or chemical action into a sheet shape.

14. The pressure wave generating element according to claim 1, wherein the fiber comprises a plurality of fibers of a woven fabric in which warps and wefts are combined.

15. The pressure wave generating element according to claim 1, wherein the fiber comprises a plurality of fibers forming a knitted fabric.

16. A pressure wave generating element comprising:

a support;

a heat generating layer disposed on the support and configured to generate heat by energization;

a pair of electrodes disposed on a surface of the heat generating layer opposite the support, wherein the heat generating layer includes a fiber with at least a partial metal coating on a surface thereof, and wherein the pair of electrodes are disposed on opposing sides of the surface of the heat generating layer.

17. The pressure wave generating element according to claim 16, wherein the pair of electrodes each have a comb-shaped electrode structure.

18. The pressure wave generating element according to claim 16, wherein the partial metal coating has a thickness that increases with an increasing distance from the support.

19. The pressure wave generating element according to claim 16, wherein the partial metal coating has a thickness that increases with an increasing distance from the support.

20. The pressure wave generating element according to claim 16, wherein the fiber comprises a plurality of fibers of a nonwoven fabric that is bonded or intertwined by one of a thermal, mechanical or chemical action into a sheet shape.

* * * * *